June 17, 1930.  H. C. SCHAPER  1,764,649
SCALE BEARING
Filed April 20, 1928  4 Sheets-Sheet 1
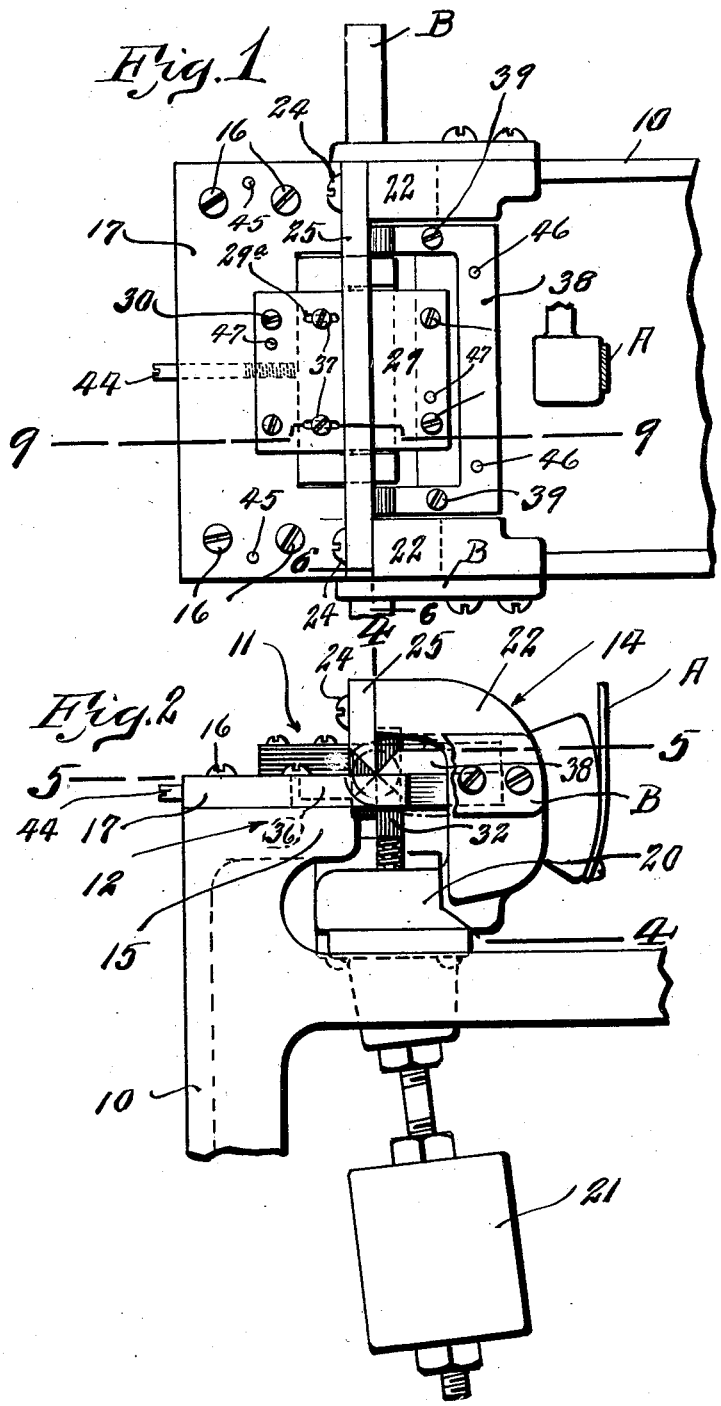
Inventor
Harry C. Schaper
By Cornwall, Bedell, Janie

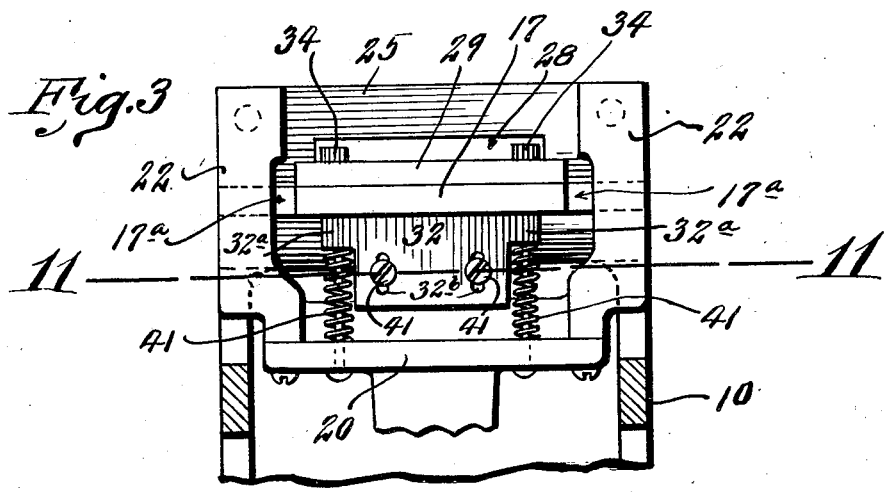
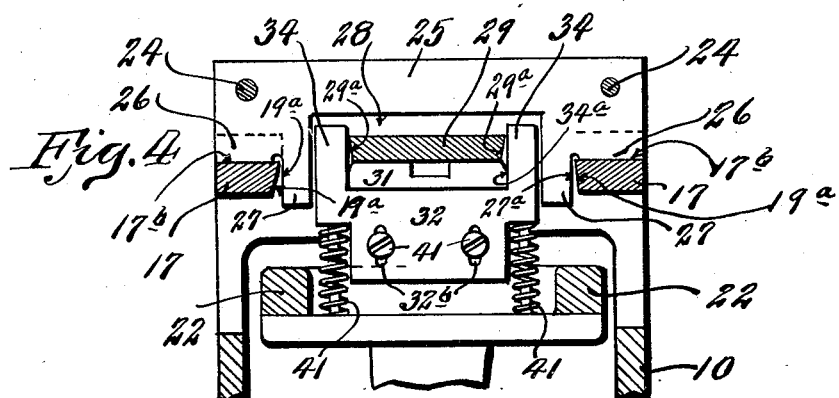
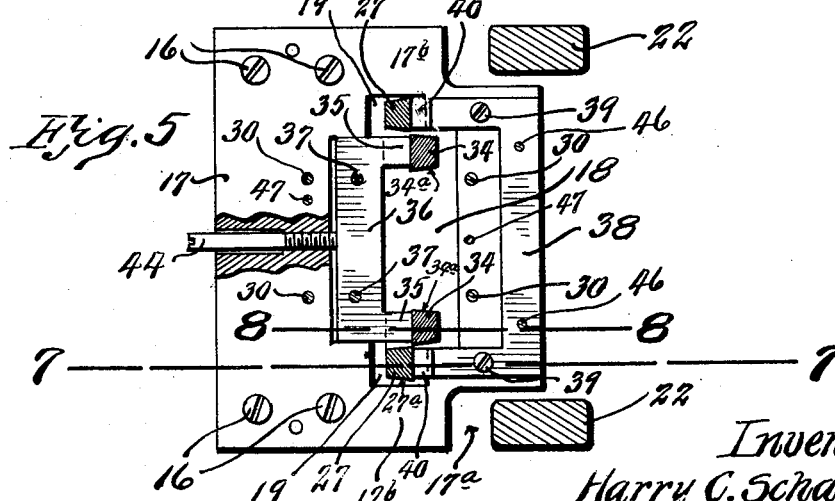

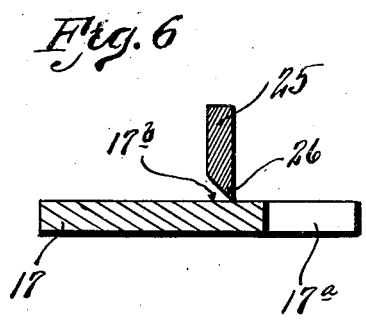
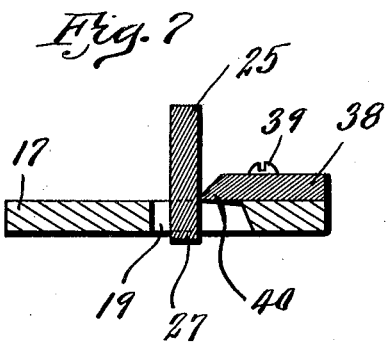
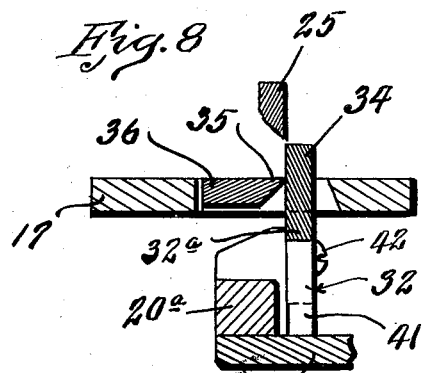
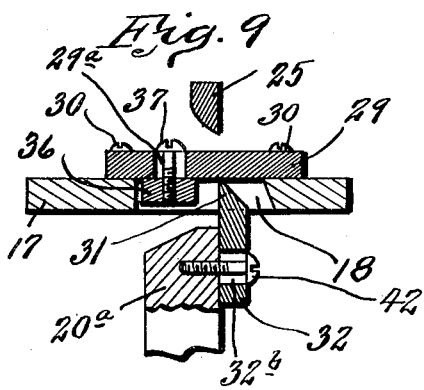
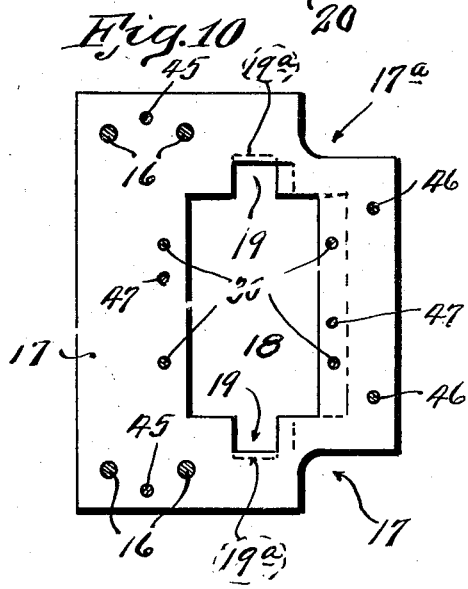
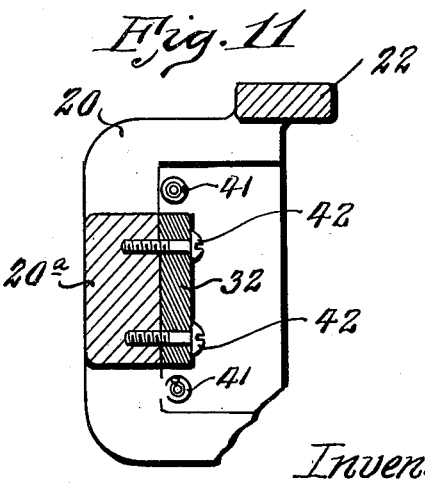

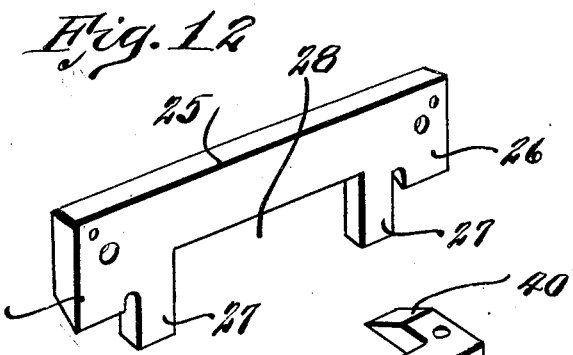
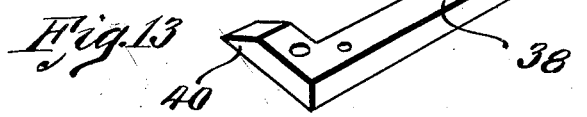
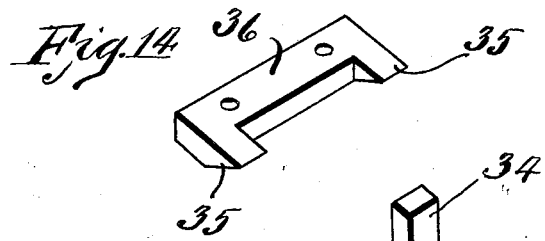
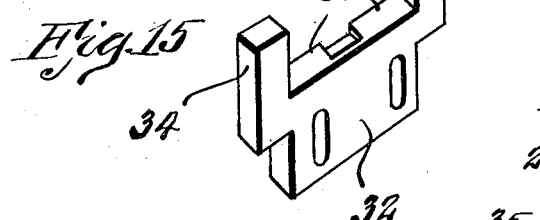
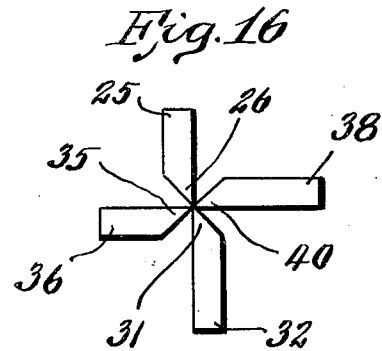

Patented June 17, 1930

1,764,649

UNITED STATES PATENT OFFICE

HARRY C. SCHAPER, OF ST. LOUIS, MISSOURI, ASSIGNOR TO SCHAPER SCALE COMPANY, OF ST. LOUIS, MISSOURI, A CORPORATION OF MISSOURI

SCALE BEARING

Application filed April 20, 1928. Serial No. 271,542.

This invention relates to new and useful improvements in bearings and more particularly to knife edge bearings for scales.

The primary object of the invention is to provide a bearing in which the knife edge member bears against a flat surface, thereby reducing the friction to minimum and increasing the accuracy and sensitiveness of the bearing.

Other objects of the invention are to arrange the cooperating members of the bearing so as to preserve the cooperative relation thereof at all times.

Further objects of the invention are to provide a plurality of knife edge members disposed angularly relative to each other and having their knife edges arranged in alignment to form a common axis.

Still further objects of the invention are to provide a plurality of knife edge members disposed angularly to each other with their knife edges arranged in central alignment to form a common axis, each of said knife edges bearing against a flat surface disposed at right angles thereto whereby the fulcrums of said knife edge members are held in coaxial alignment by the correlation thereof.

Additional objects of the invention are to provide a plurality of knife edge members arranged in pairs, the members of each pair being arranged in opposed spaced relation with each other so as to bring the knife edges thereof in alignment, the two pairs being disposed at right angles to each other so as to provide a common axis for all of said knife edge members, and to provide a flat surface bearing for each knife edge member, said bearings being so disposed as to hold all of said knife edge members to their common axis.

With these and other objects in view, my invention consists in certain novel features of construction and arrangement of parts, hereinafter more fully described and claimed, and illustrated in the accompanying drawings, in which—

Figure 1 is a top plan view of the bearing showing parts of the scale with which it is associated.

Figure 2 is a side elevational view thereof.

Figure 3 is a rear elevational view of same.

Figure 4 is a vertical cross section taken on line 4—4 of Figure 2.

Figure 5 is a horizontal cross section taken on line 5—5 of Figure 2.

Figure 6 is a vertical cross section taken on line 6—6 of Figure 1.

Figure 7 is a vertical cross section taken on line 7—7 of Figure 5.

Figure 8 is a vertical cross section taken on line 8—8 of Figure 5.

Figure 9 is a vertical cross section taken on line 9—9 of Figure 1.

Figure 10 is a top plan view of the supporting plate.

Figure 11 is a horizontal cross section taken on line 11—11 of Figure 3.

Figure 12 is a perspective detail view of the top knife edge member.

Figure 13 is a perspective detail view of the rear knife edge member.

Figure 14 is a perspective detail view of the forward knife edge member.

Figure 15 is a perspective detail view of the bottom knife edge member.

Figure 16 is a diagrammatic view showing the knife edge members in correlated positions.

It is well known in the scale art that a knife edge operating on a flat surface forms the most efficient and accurate bearing. However, such bearing has not heretofore been commercially successful due to the fact that such knife edge was readily injured by jarring or excessive strain and could not be held in proper axial alignment.

The present invention contemplates the use of a series of knife edge members disposed preferably at right angles to each other with their edges arranged in axial alignment and having bearings on flat surfaces disposed at right angles relative to the respective knife edges, whereby said knife edge members and flat surface bearings cooperate to form a self-centering bearing in which the various stresses are taken care of by the respective bearing members.

The invention as disclosed in the drawings is shown applied to a weighing scale of the type shown in my copending application Serial No. 201,924, filed June 27, 1927. However, my improved bearing can be used in connection with other types of scales and in other instances where an accurate bearing is required.

Referring by numerals to the accompanying drawings, 10 indicates a support which carries a bearing 11 comprising a stationary part 12 and a movable part 14. Support 10 is provided with a table portion 15 on which is secured, by means of screws 16, a stationary horizontally disposed plate 17. This plate is provided with a transversely disposed opening 18 having its ends terminating in notches 19 (see Figure 10). The rear end of said plate is reduced in width to provide clearing spaces 17$^a$.

A movable scale member 20, which in the present instance is provided with a pendulum 21, is formed with a pair of upwardly projecting arms 22, the ends of which are turned forwardly and have secured thereto by means of screws 24 a vertically disposed top knife edge member 25. This knife edge member 25 is provided at each end with a downwardly presented knife edge 26 which bears against a flat surface 17$^b$ of plate 17 disposed adjacent to each notch 19. Plate 25 has formed integral therewith depending portions 27 which are spaced inwardly of knife edges 26 and extend downwardly a suitable distance below the latter into notches 19. The central portion of member 25 is cut away to provide a central clearing space 28 (see Figure 4).

A horizontally disposed plate 29 is arranged on top of plate 17 and spans slot 18, being secured in position on said plate 17 by screws 30. Bearing against the underside of this plate 29 are knife edges 31 of a bottom knife edge member 32, which latter is secured to and projects upwardly from a pad 20$^a$ of the movable part or element 20. Knife edges 26 and 31 are formed by beveling the opposed edges on opposite sides so that said knife edges are disposed in the same vertical and horizontal planes. Plate 29 is considerably narrower than the distance between depending projections 27 and extending into the space thus formed are upward projections 34 formed integral with member 32.

Bearing against the forward faces of projections 34 are rearwardly presented knife edges 35 of a horizontally disposed knife edge member 36, which latter is disposed in the forward portion of slot 18 and is held in position by screws 37. These screws are carried by plate 29, there being longitudinal slots 29$^a$ formed in said plate to allow longitudinal adjustment of knife edge member 36.

A rear knife edge member 38 is fixed on the rear reduced end of plate 17 by means of screws 39 and is provided with forwardly projecting knife edges 40 which bear against the rearwardly presented flat surfaces of projections 27 (see Figure 5). The upper face of member 36 is arranged flush with the upper face of plate 17 and member 38 is disposed on plate 17 so that the opposed sides of member 36 and member 38 are arranged in the same horizontal plane and the respective knife edges 35 and 40 thereof are also arranged in the same horizontal plane with each other and in alignment with knife edges 26 and 31 so that all four of said knife edges have an axis common to all of them. As the respective knife edge members are disposed at right angles to each other they are held to their flat bearings and against movement in either horizontal or vertical plane without the use of any devices or construction which might increase the friction between the cooperating members and impair the effectiveness of the bearing.

Plate 17 is stationary and forms a support for the movable part 20 by means of upper knife edge member 25 whose knife edge 26 bears against the upper face of plate 17. The lower knife edge member 32 bears against the underside of plate 29 which is fixed to the top plate 17. Thus knife edge member 25 is held against displacement in a vertical plane by said lower knife edge member 32.

The knife edges 31 of member 32 are yieldingly held against plate 29 in order to maintain knife edges 26 in engagement with plate 17 without the danger of binding or excessive pressure and friction. This yielding pressure is furnished by two coiled springs 41 seated on the bottom of element 20 and having their upper ends bearing against the overhanging portions or shoulders 32$^a$ formed on the opposite ends of member 32. The latter is secured to pad 20$^a$ by means of screws 42 screwed in said pad and passing through vertically disposed slots 32$^b$ formed in member 32. In this manner plate 32 is allowed upward movement under the influence of springs 41 so as to bring the edges 31 of member 32 in proper engagement with the underside of plate 29, whereupon screws 42 are tightened to retain members 32 in proper position.

The horizontally disposed knife edges 35 and 40 are maintained in proper contact with the respective vertically disposed members 34 and 27 by the adjustment of member 36 in a horizontal plane. This adjustment is obtained by means of a screw 44 which is threaded in plate 17 and has its inner end bearing against the corresponding edge of plate 36. Thus all of the knife edges are brought in proper alignment with each other and are held in proper contact with the respective bearing surfaces without undue pressure or friction or excessive play. The respective parts are held against lateral or axial movement by plate 17, projections 27 being disposed in slots 19. The contiguous sides 19ª and 27ª are tapered so as to eliminate large surface contact therebetween. Similarly, the inner sides of projections 34 and the sides of plate 29 are tapered as indicated at 34ª and 29ª, respectively. Dowel pins 45 are used to properly locate plate 17 on support 10 and said plate 17 is provided with dowel pins 46 for properly centering knife edge member 38, while dowel pins 47 are used to properly position plate 29 on plate 17.

When the bearing is used in conjunction with an indicating scale, such as disclosed in the aforementioned application, the movable part or element 14 of the bearing is connected by a connection A to a movable part of the weighing scale, such as the scale beam, whereby said element 14 is actuated in accordance with said beam. Arms 22 have secured thereto trunnions B which are disposed coaxially with the axis of the knife edges.

The indicating mechanism which it is desired to actuate is operatively connected to said pinions. Thus the indicating mechanism is actuated through the medium of said bearings in accordance with the movable part of the scale.

The knife edges are preferably so formed as to bring the apices thereof in the same plane with one side of the knife edge members. Each pair of knife edge members has its members disposed in opposed relation with their edges or apices spaced longitudinally and in alignment with each other. This arrangement simplifies the construction and renders it more compact and prevents undue strains against any one of said knife edges.

The bearing herein disclosed is particularly adapted for use in conjunction with weighing scales but it will be readily understood that it may be used in other constructions in which an accurate and efficient bearing is required.

While I have shown and described the preferred form of my invention, it will be readily understood that minor changes in the size, form and construction of the various parts may be made and substituted for those shown without departing from the spirit of my invention, as set forth in the accompanying claims.

I claim:

1. A bearing comprising a stationary part, a movable part, a plurality of knife edge bearing members fixed to said stationary part, and a plurality of knife edge bearing members fixed to said movable part, all of said bearing members being detachably mounted and having their knife edges disposed angularly relative to each other around a common axis.

2. A bearing comprising a stationary part, a knife edge bearing member detachably fixed to said stationary part, a movable part, and a plurality of knife edge bearing members fixed to said movable part, all of said knife edge bearing members having their knife edges disposed around a common axis and adapted to bear against flat bearings arranged at right angles to the respective knife edges.

3. A bearing comprising a stationary part, a pair of opposed knife edge members fixed to said part and having their knife edges disposed in the same axis, a movable part, and a pair of opposed knife edge members fixed thereto and having their knife edges in axial alignment with the knife edges of the first pair, there being a flat bearing surface provided for each knife edge.

4. A bearing comprising a stationary part, a pair of opposed knife edge members fixed to said part and having their knife edges disposed in alignment to form a common axis, a movable part, and a pair of opposed knife edge members disposed at right angles to the first pair and having their knife edges in alignment with the edges of said first pair to form an axis common to all of said knife edges.

5. A bearing comprising a stationary part, a pair of opposed knife edge members fixed to said part and having their knife edges disposed in spaced relation with each other and in axial alignment, a movable part, and a pair of opposed knife edge members disposed angularly to the first pair and having their knife edges arranged in spaced relation with each other and with the knife edges of said first pair and in axial alignment to form an axis common to all of said knife edge members.

6. A bearing comprising a stationary part, a pair of opposed knife edge members fixed to said part and having their knife edges arranged in axial alignment, a movable part, a pair of opposed knife edge members disposed angularly to the first pair and having their knife edges in alignment with the knife edges of said first pair to form an axis common to all of said knife edges, and a plurality of flat bearing surfaces disposed at right angles to the respective knife edges to form bearings therefor.

7. A bearing comprising a stationary part, a pair of opposed knife edge members fixed to said part and having their knife edges arranged in axial alignment, a movable part, a pair of opposed knife edge members disposed angularly to the first pair and having their knife edges in alignment with the knife edges of said first pair to form an axis common to all of said knife edges, and a plurality of flat bearing surfaces, each of which is arranged in correlation with certain of said knife edge members and forms a bearing for the other knife edge member.

8. A bearing comprising a stationary part having a plurality of oppositely disposed flat bearing surfaces, a pair of opposed knife edge members fixed to said part and having their knife edges arranged in axial alignment, a movable part having a plurality of flat oppositely disposed bearing surfaces engaged by the knife edges of said stationary part, and a pair of opposed knife edge members fixed to said movable part and having their knife edges bearing against the flat surfaces of said stationary part.

9. A bearing comprising a stationary part, a movable part, and a plurality of knife edge members disposed in pairs, one pair being attached to said stationary part and the other pair to said movable part, the knife edges of all of said members extending centripetally to form a common axis.

10. A bearing comprising a movable part, a stationary part, a pair of opposed knife edge members secured to said movable part and engaging said stationary part, a pair of opposed knife edge members secured to said stationary part and engaging said movable part, said knife edges being arranged at right angles to each other and having their knife edges spaced longitudinally around a common axis.

11. A bearing comprising a stationary part provided with a plurality of opposed flat bearing surfaces, a pair of opposed knife edge members fixed to said stationary part and having their apices arranged in coaxial alignment, a movable part provided with a plurality of opposed flat bearing surfaces engaged by the knife edges of said first pair of knife edge members, and a second pair of knife edge members having their apices arranged in coaxial alignment with the apices of the first pair of members and bearing against the flat surfaces of said stationary part.

12. A bearing comprising a stationary part provided with a plurality of opposed flat bearing surfaces disposed in the same horizontal plane, a pair of opposed knife edge members fixed to said stationary part and having their apices arranged in coaxial alignment and in the same plane with said surfaces, a movable part provided with a plurality of opposed flat bearing surfaces disposed in the same vertical plane and engaged by the apices of the first pair of members, and a second pair of knife edge members secured to said movable part and having their apices arranged in coaxial alignment with the apices of the first pair and in the same plane with said vertically disposed surfaces and bearing against the horizontally disposed surfaces.

13. A bearing comprising a stationary part provided with a plurality of opposed flat bearing surfaces arranged in the same plane with each other, a pair of opposed knife edge members fixed to said stationary part and having their apices spaced longitudinally and coaxially with each other, a movable part provided with a plurality of opposed flat bearing surfaces disposed in the same plane with each other and at right angles to the plane of the first mentioned surfaces and forming bearings for the knife edges of said first-mentioned pair of members, and a second pair of knife edge members fixed to said movable part and having their knife edges arranged in spaced longitudinal and coaxial relation with each other and with said first pair and bearing against the flat surfaces of said stationary part, one of the members of the second pair being yieldably held against its flat bearing to hold the bearing members of the movable part in proper operative relation with said stationary part.

14. A bearing comprising a stationary part provided with a plurality of opposed flat bearing surfaces disposed in the same plane relatively to each other, a pair of opposed knife edge members fixed to said stationary part and having their knife edges arranged in spaced longitudinal and coaxial relation, means for adjusting one of said members relatively to the other, a movable part provided with a plurality of opposed flat bearing surfaces disposed in the same plane with each other and at right angles to the surfaces of said stationary part and engaged by the knife edge members thereof, and a second pair of knife edge members fixed to said movable part and having their knife edges arranged in spaced longitudinal and coaxial relation with each other and with the knife edges of the first pair of members, the knife edges of said second pair of members bearing against the flat surfaces of said stationary part.

15. A bearing comprising a stationary part provided with a plurality of opposed flat bearing surfaces disposed in the same plane relatively to each other, a pair of opposed knife edge members fixed to said stationary part and having their knife edges arranged in spaced longitudinal and coaxial relation, means for adjusting one of said members relatively to the other, a movable part provided with a plurality of opposed flat bearing surfaces disposed in the same plane with each other and at right angles to the surfaces of said stationary part and engaged by the knife edge members thereof, a second pair of knife edge members fixed to said movable part and having their knife edges arranged in spaced longitudinal and coaxial relation with each other and with the knife edges of the first pair of members, the knife edges of said second pair of members bearing against the flat surfaces of said stationary part, and means for yieldably holding one of said knife edge members of the second pair against its bearing to hold the knife edge members of the movable part in proper operative relation with the bearings of said stationary part.

16. In a bearing of the class described, a horizontally disposed plate having oppositely disposed bearing surfaces arranged in the same horizontal plane, a pair of horizontally disposed knife edge members carried by said plate and having their knife edges arranged in the same horizontal plane with said surfaces and in coaxial relation with each other, a vertically disposed plate having oppositely disposed bearing surfaces arranged in the same vertical plane, a pair of vertically disposed knife edge members movable with said plate and having their opposed knife edges arranged in the same vertical plane with the bearing surfaces thereof and in spaced coaxial relation with each other and with the knife edges of said horizontally disposed members, said horizontally disposed knife edges having bearings in said vertically disposed surfaces and said vertically disposed knife edge members having bearings in said horizontally disposed surfaces.

17. In a bearing of the class described, the combination of a fixed part and a movable part, each of which is provided with a plurality of flat bearing surfaces and a pair of opposed knife edge members, having their edges disposed coaxially, the knife edges of one part being disposed at right angles to and having bearings in the surfaces of the other part, and the knife edges of all of said members being aligned to form a common axis.

18. In a bearing of the class described, the combination of a fixed part and a movable part, one of which is provided with a plurality of horizontally disposed bearing surfaces and a pair of opposed knife edge members, the apices of which are spaced coaxially and in the same plane with said surfaces, and the other of said parts being provided with a plurality of vertically disposed bearing surfaces and a pair of opposed knife edge members, the apices of which are disposed in the same plane with said vertical surfaces and coaxially with the apices of the first pair, the knife edge members of one part having bearings on the flat surfaces of the other part to form a common axis.

19. A bearing for scales comprising a support, a fixed element carried thereby and provided with a plurality of opposed bearing surfaces, and a pair of opposed knife edge members, the apices of which are disposed in the same plane with each other and with said bearing surfaces; and a movable element provided with a plurality of opposed bearing surfaces and a pair of opposed knife edge members, the apices of which are disposed in the same plane with each other and with the bearing surfaces of said movable element, the bearing surfaces of one element being disposed at right angles to the bearing surfaces of the other element and engaged by the knife edges thereof and all of said apices being aligned to form a common axis.

20. A bearing for scales comprising a support, a horizontally disposed plate carried thereby and provided with a plurality of opposed horizontally disposed bearing surfaces, a pair of opposed horizontally disposed knife edge members, a movable element, a pair of opposed vertically disposed knife edge members fixed to said element and having their apices bearing against the horizontal surfaces of said plate for pivotally supporting said element on said plate, a plurality of vertically disposed bearing surfaces in fixed relation with said movable element and engaged by the apices of said horizontally disposed knife edge members, the apices of all of said knife edge members being arranged in spaced coaxial relation with each other to form a common axis and means for operatively connecting said movable member to a scale mechanism.

In testimony whereof I hereunto affix my signature this 26th day of March, 1928.

HARRY C. SCHAPER.